United States Patent [19]

Boden et al.

[11] Patent Number: 4,572,820
[45] Date of Patent: Feb. 25, 1986

[54] PROCESS AND APPARATUS FOR THE PRODUCTION OF A FLOWABLE REACTION MIXTURE

[75] Inventors: Heinrich Boden, Leverkusen; Walter Schneider, Overath, both of Fed. Rep. of Germany

[73] Assignee: Bayer Aktiengesellschaft, Leverkusen, Fed. Rep. of Germany

[21] Appl. No.: 650,486

[22] Filed: Sep. 14, 1984

[30] Foreign Application Priority Data

Oct. 1, 1983 [DE] Fed. Rep. of Germany ....... 3335785

[51] Int. Cl.$^4$ .............................................. G05D 11/02
[52] U.S. Cl. ...................................... 422/133; 137/99; 239/417.5
[58] Field of Search .......................... 422/133; 137/99; 239/417.5

[56] References Cited
U.S. PATENT DOCUMENTS

| | | | |
|---|---|---|---|
| 2,696,266 | 12/1954 | Tuve | 137/99 X |
| 3,023,968 | 3/1962 | Mitchell | 239/417.5 |
| 3,073,533 | 1/1963 | Weinbrenner et al. | 239/399 |
| 3,245,661 | 4/1966 | Breer et al. | 259/4 |
| 3,415,568 | 12/1968 | Gugelot et al. | 296/31 |
| 4,246,230 | 1/1981 | Hasselman, Sr. | 422/133 |
| 4,262,848 | 4/1981 | Chabria | 239/417.5 |
| 4,399,105 | 8/1983 | Tilgner et al. | 422/133 |

*Primary Examiner*—Arthur Kellogg
*Attorney, Agent, or Firm*—Gene Harsh; Joseph C. Gil

[57] ABSTRACT

The invention is directed to a process for the production of a flowable reaction mixture from at least two flowable reaction components which comprises conveying said components from storage zones as main flows, metered in a predetermined ratio, to several mixing zones which are connected in parallel, said process further characterized in that the main flows are divided up in each case into a number of divisional flows corresponding to at least the number of mixing zones, which divisional flows are combined with each other in pairs, and the metering ratio of the divisional flows corresponds to the metering ratio of the main flows. The invention is also directed to an apparatus for the production of flowable reaction mixtures from at least two flowable reaction components comprising storage containers from which supply lines lead via metering pumps to at least three mix heads which are positioned in parallel, further characterized in that one metering pump is provided for each reaction component, and flow dividers consisting of parallel-positioned elements are provided between these metering pumps and the mix heads in the supply lines.

9 Claims, 3 Drawing Figures

PROCESS AND APPARATUS FOR THE PRODUCTION OF A FLOWABLE REACTION MIXTURE

BACKGROUND OF THE INVENTION

This invention relates to a process and an apparatus for the production of a flowable reaction mixture which can react to form a plastic material, and particularly a polyurethane material. The process is characterized in that at least two flowable reaction components are guided from supply zones as main flows, and are metered in a predetermined ratio to several mixing zones which are connected in parallel.

It is known (German Auslegeschrift No. 1,114,313 corresponding to U.S. Pat. No. 3,073,533), that it is possible to foam into the corners of refrigerators simultaneously using four mixing heads. The components can be supplied to these mixing heads either by use of a central pump station or by separate pumps and control relays for each mixing head. Thus, in the first embodiment, one pump per component is allocated to each mixing head, and the central pump station has a common drive for the pumps. In the second embodiment, the individual pumps are driven separately. However, the expense in terms of apparatus is considerable. More importantly, the area surrounding the mold can only be reached with difficulty due to the large apparatus and to the plurality of pipelines and tube-lines leading to the mixing heads. This necessarily means that operating staff are hindered in their work. The great spatial requirement is also a disadvantage.

In order to avoid this expense, a distributing pipe system has been inserted into the cavity provided for the foam core during the production of motor vehicle underbodies (U.S. Pat. No. 3,415,568) consisting of two shells enclosing a foam core. This system is connected to a single mixing head and has several outlets at desired points. This distributing pipe system remains in the foam core and simultaneously serves as a reinforcing insert. This method cannot be used in the case of thin-walled moldings, and many moldings do not require a reinforcing insert.

An object of the present invention is to provide a process and an apparatus which may be used to fill cavities, and in particular to fill molds having a high charging capacity with a low flow front speed. Additionally, the surroundings of the filling point or of the molds are occupied by only a few compact parts so that a good accessibility is provided.

DESCRIPTION OF THE INVENTION

Figure 1:
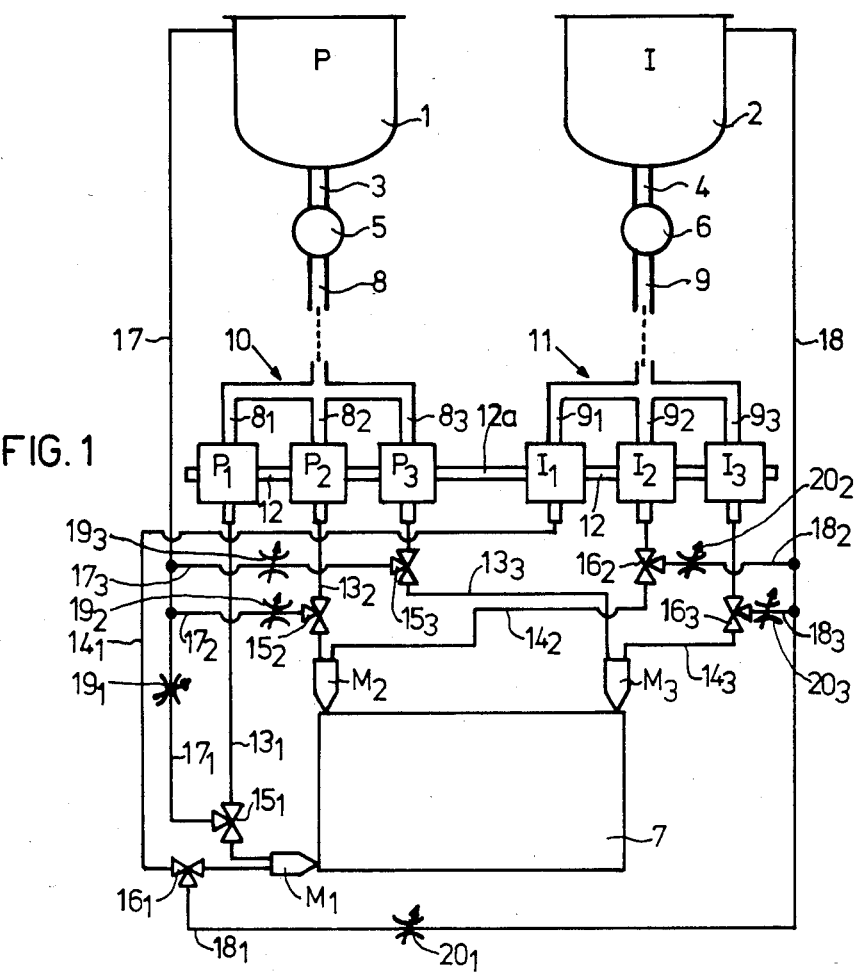
FIG. 1 represents a schematic of the apparatus of the present invention.

The objects are achieved according to the process of the present invention in that the main flows are divided up into a number of divisional flows corresponding to the number of mixing zones. The divisional flows are grouped in pairs. The metering ratio of the paired divisional flows is maintained at the same metering ratio as the main flows. Consequently, the main flows need to be divided only shortly before the filling point of the mold, while the metering pumps may be provided further away.

The present process may also be advantageously used for filling several mold cavities. This is particularly the case in the arrangement of several molds on a mold carrier or with several cavities in one mold. Hitherto, such molds or cavities have either been filled in parallel, starting from a mixing head via a common pouring channel, or filled in succession. In the latter case, the mixing heads allocated to the mold cavities would be operated successively. In the former case, a different degree of filling with a different deaeration of the cavities had to be accepted as a disadvantage. The allocated mixing heads were supplied with constant volume flows of the components. A parallel filling (which can be coordinated with the volume to be filled) with different volume flows (partial quantities), as provided by the present process was impossible.

According to one particular embodiment of the present process, the main flows are divided up into divisional flows of different quantities. In this manner, it is possible to deliver different quantities of components to the different mixing heads, coordinated with the geometric conditions inside the mold cavity, so that the mixing heads discharge different quantities of mixture per unit of time. It is thus possible to introduce a greater volume flow of reaction mixture into larger, very simply constructed sections of the mold cavity than into other sections in which the flow front speed of the reaction mixture must be held within limits due to a possible narrowing and a smaller thickness of the molding to be produced.

At least one of the divisional flows is preferably returned at least occasionally to the supply zones.

The filling procedure of the mold cavity may be easily optimized by connecting or disconnecting one or more mixing heads in a time-staggered manner. This measure is advisable, for example if one part of a mold cavity is desired to be filled first and if a second mixing head containing the corresponding partial volume flow of reaction mixture is desired to be connected or disconnected in a time-staggered manner after the formation of a corresponding flow front and after the deaeration of a complicated section of the mold cavity.

The apparatus for carrying out the present process proceeds from storage containers, from which supply lines lead via metering pumps to several mix heads which are connected in parallel.

The novelty of the present invention resides in the fact that one metering pump is provided for each reaction component, and that hydraulic flow dividers consisting of parallel-positioned elements are provided in the supply lines between these metering pumps and the mix heads.

Flow dividers of this type were known hitherto as oil flow dividers. They are composed of individual elements which are interconnected by means of a common shaft, as toothed wheel flow dividers or radial- or axial-piston flow dividers. They are disclosed in, for example "Hydraulische mengenteile (Ölstromteiler)" of Jahns-Regulatoren GmbH, D 6050 Offenbach/Main, edition 3/83. Since these flow dividers do not have their own drive, they are of a relatively small overall size, and they may be positioned in the immediate vicinity of the mold without taking up a large amount of space. Since the elements of each flow divider sit on a common shaft and are driven by the divisional flows, the metering ratio of the components which is predetermined by the metering pumps is also maintained in the divisional flows during the dividing-up procedure.

Another advantage (for example when toothed wheel flow dividers are used) is that the momentary main volume flow and all the divisional volume flows can be measured and monitored. If the flow dividers for the various reaction components are rigidly coupled together, then in one advantageous embodiment only one metering pump for the flow divider of one component is necessary. In this case, the flow dividers of the other components are supplied either by means of simple conveying pumps of a relatively low metering accuracy or by pressure-charged (storage) containers.

According to one particular embodiment, the elements of the flow dividers have a different throughput capacity. This means that the individual elements are of a different overall size, which may be achieved in the case of toothed wheel dividers, for example by different widths of the toothed wheels. Several elements of one flow divider may also be connected in parallel on one of the mix heads.

According to another embodiment of the present apparatus the elements of each flow divider are interconnected by reducing gears. This measure as well allows the main flow of each component to be split up into divisional flows of different sizes. The reducing gears may preferably be switchable. Consequently, the proportions of the divisional flows may be changed during transport. For example, this means that one mix head may discharge more or less reaction mixture after a certain time, depending on requirements.

Of course, in all these embodiments, care must be taken that the elements of the flow dividers for each component which are allocated in each case to one specific mix head must be designed so that they correspond to each other or may be influenced correspondingly to one another.

It is also possible to vary the metering ratio of divisional flows of the components compared to others, by providing an element of a different size or a reducing gear only for a specific divisional flow of a component, and connecting it accordingly. The same result may be achieved by the connection or disconnection of injection nozzles which may be controlled independently of each other, in recirculation mixing heads if a flow divider element is allocated to each nozzle.

Thus, it is seen that the present invention has a number of particular advantages.

The new apparatus is shown in a purely schematic manner in the drawings and will now be described in more detail.

In FIG. 1, lines 3,4 lead from storage containers 1,2 for polyol (P) and isocyanate (I) to metering pumps 5,6. These pumps are positioned some distance away from a mold 7. Longer supply lines 8,9 lead from the metering pumps 5,6 to flow dividers 10,11 which are positioned near or on the base of the mold 7. The supply lines 8,9 divide up into branch lines $8_1,8_2,8_3$, and $9_1,9_2,9_3$ respectively. Each of these branch lines $(8_1,8_2,8_3$ and $9_1,9_2, 9_3)$ discharges into one of the elements ($P_1,P_2$, $P_3$; $I_1,I_2,I_3$) of the flow dividers 10,11. The elements $P_1,P_2,P_3$; $I_1,I_2,I_3$ are constructed in the manner of gear pumps and are inter-connected by a common shaft 12. The metering pumps 5,6 supply the components (polyol and isocyanate) in a volumetric ratio of 1:1. Thus, in this case, the two flow dividers 10,11 have the common shaft $12a$ which ensures that the metering ratio is maintained in an exact manner when the flows are divided up. On the outlet side, the components are combined ($P_1I_1$; $P_2I_2$; $P_3,I_3$) and are mixed with one another via supply lines $13_1,14_1$; $13_2,14_2$; $13_3,14_3$ via switch-over cocks $15_1,16_1$; $15_2,16_2$; $15_3,16_3$ in mix heads $M_1,M_2,M_3$ which are positioned at different corners of the mold 7 and open into the mold cavity. Branch return lines $17_1,17_2,17_3$; $18_1,18_2$, $18_3$ lead off from the switch-over cocks $15_1,16_1$; $15_2,16_2$; $15_3,16_3$ to collecting return lines 17,18 which discharge into the supply containers 1,2. When so-called "recirculation mixers" are used, the switch-over cocks $15_1$, $16_1;15_2,16_2$; $15_3,16_3$ are not required. Choke members $19_1,19_2,19_3$; $20_1,20_2,20_3$ are optionally provided in the branch return lines $17_1$, $17_2,17_3$; $18_1,18_2,18_3$, so that the circulation pressure may be adjusted to the level of the mixing pressure.

Figures 2, 3:
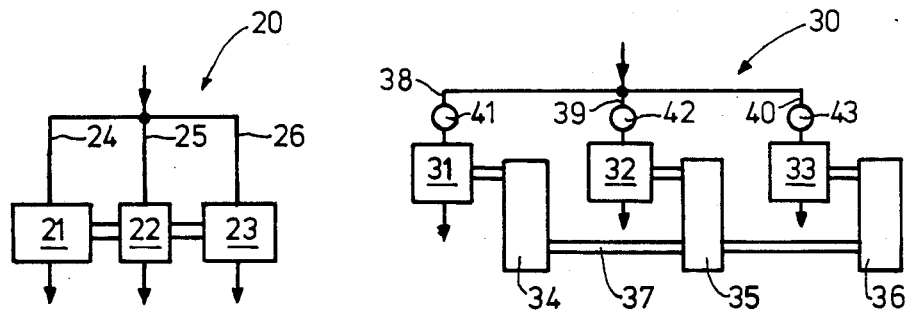
FIG. 2 shows one embodiment of a flow divider useful in the present invention.
FIG. 3 shows a second embodiment of a flow divider useful in the present invention.

The flow divider shown in FIG. 2 consists of toothed wheel-like elements 21,22,23. The different size of the elements 21,23 compared to the element 22 is to symbolize the different throughput quantity. The different throughput quantity is based on different volumes conveyed through a different width of the toothed wheels.

In the case of the flow divider shown in FIG. 3, the elements 31,32,33 are not directly connected by a common shaft, but indirectly by reversible reducing gears 34,35,36 which are connected by a common shaft 37. Stopcocks 41,42,43 are positioned in the branch lines 38,39,40.

The embodiment according to FIG. 3 is particularly suitable for installations without return lines, because in this case, the supply to the corresponding mix heads may be interrupted by the stopcocks. In this arrangement, the particular flow divider element 31,32,33 is disconnected via the reducing gear 34,35,36 which may be connected in each case, synchronously to one of the stopcocks 41,42,43 being closed, so that the flow divider element no longer operates. However, it is to be considered that in the case of a constant main volume flow, when a flow divider element is connected and disconnected, the remaining volume divisional flows change accordingly. This phenomenon does not occur when recirculation mixing heads are used, because in this case, the flow divider elements are not disconnected.

In the recirculation position of a mix head, the volume divisional flows offered by the relevant flow divider elements to the mixing head are returned to the storage containers in a known manner past the closed mixing chamber. Upon switching over to the mixing position, the volume divisional flows of the reaction components enter the mixing chamber and are mixed therein. The resulting reaction mixture flows out of the mixing chamber through a pouring system into the mold.

What is claimed is:

1. A process for the production of a flowable reaction mixture from at least two flowable reaction components which comprises conveying said components from storage zones as main flows, metered in a predetermined ratio, to several mixing zones which are connected in parallel, said process further characterized in that the main flows are divided up in each case into a number of divisional flows corresponding to at least the number of mixing zones, which divisional flows are combined with each other in pairs, and the metering ratio of the divisional flows corresponds to the metering ratio of the main flows.

2. A process according to claim 1, characterized in that the main flows are divided up into divisional flows of different quantities.

3. A process according to claim 1, characterized in that at least one of the paired divisional flows is returned to a storage zone.

4. A process according to claim 3, characterized in that the return to the storage zone only takes place occasionally.

5. A process for the production of a flowable reaction mixture from at least two flowable reaction components which comprises conveying said components from storage zones as main flows, metered in a predetermined ratio, to several mixing zones which are connected in parallel, said process further characterized in that the main flows are divided up in each case into a number of divisional flows corresponding to at least the number of mixing zones, which divisional flows are combined with each other in pairs and the metering ratio of the divisional flows differs from the metering ratio of the main flows.

6. An apparatus for the production of flowable reaction mixtures from at least two flowable reaction components comprising storage containers from which supply lines lead via metering pumps to at least three mix heads which are positioned in parallel, further characterized in that one metering pump is provided for each reaction component, and flow dividers consisting of parallel-positioned elements are provided between these metering pumps and the mix heads in the supply lines.

7. An apparatus according to claim 6, characterized in that the elements of the flow dividers have a different throughput capacity.

8. An apparatus according to claim 6, characterized in that the elements of each flow divider are interconnected by reducing gears.

9. An apparatus according to claim 8, characterized in that the reducing gears are switchable.

* * * * *